(12) United States Patent
Murai et al.

(10) Patent No.: US 11,809,053 B2
(45) Date of Patent: Nov. 7, 2023

(54) ELECTRICAL COLOR CONTROL FILM AND VEHICLE OUTER PANEL

(71) Applicant: TOYOTA JIDOSHA KABUSHIKI KAISHA, Toyota (JP)

(72) Inventors: Yuki Murai, Nagakute (JP); Shinji Tani, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/699,751

(22) Filed: Mar. 21, 2022

(65) Prior Publication Data

US 2022/0317537 A1 Oct. 6, 2022

(30) Foreign Application Priority Data

Apr. 2, 2021 (JP) ................................. 2021-063760

(51) Int. Cl.
| | |
|---|---|
| G02F 1/153 | (2006.01) |
| G02F 1/137 | (2006.01) |
| G02F 1/1347 | (2006.01) |
| G02F 1/155 | (2006.01) |
| G02F 1/1343 | (2006.01) |
| G02F 1/1675 | (2019.01) |
| G02F 1/167 | (2019.01) |
| G02F 1/1676 | (2019.01) |

(52) U.S. Cl.
CPC ............ *G02F 1/1533* (2013.01); *G02F 1/137* (2013.01); *G02F 1/1347* (2013.01); *G02F 1/13439* (2013.01); *G02F 1/155* (2013.01); *G02F 1/167* (2013.01); *G02F 1/1676* (2019.01); *G02F 2001/1678* (2013.01); *G02F 2201/50* (2013.01)

(58) Field of Classification Search
CPC ... G02F 1/1533; G02F 1/13439; G02F 1/1347
See application file for complete search history.

(56) References Cited

U.S. PATENT DOCUMENTS

| | | | |
|---|---|---|---|
| 2002/0003571 A1* | 1/2002 | Schofield | .............. B60S 1/0885 348/148 |
| 2003/0045596 A1* | 3/2003 | Krohn | ..................... C09D 4/06 522/71 |
| 2004/0114073 A1* | 6/2004 | Sakai | .................. G02F 1/13439 349/113 |
| 2009/0304970 A1 | 12/2009 | Imaizumi et al. | |
| 2012/0107606 A1* | 5/2012 | Chang | ................ C23C 14/0664 204/192.15 |
| 2014/0168745 A1* | 6/2014 | Satou | ..................... G02F 1/163 359/266 |

(Continued)

FOREIGN PATENT DOCUMENTS

| | | |
|---|---|---|
| CN | 103869569 A | 6/2014 |
| CN | 209803527 U | 12/2019 |

(Continued)

*Primary Examiner* — Lucy P Chien
(74) *Attorney, Agent, or Firm* — Sughrue Mion, PLLC

(57) ABSTRACT

An electrical color control film includes: an underlying layer located on a metal plate; a first transparent conductive layer located on the underlying layer; an electrochromic layer located on the first transparent conductive layer; and a second transparent conductive layer located on the EC layer. The EC layer is configured in such a manner that color of the EC layer is controlled by electricity.

7 Claims, 5 Drawing Sheets

(56) References Cited

U.S. PATENT DOCUMENTS

2014/0268284 A1    9/2014  Naijo et al.

FOREIGN PATENT DOCUMENTS

| JP | 2008-094087 A | 4/2008 |
| JP | 2014-178649 A | 9/2014 |
| JP | 2017-520808 A | 7/2017 |
| WO | 2016/007168 A1 | 1/2016 |

* cited by examiner

ELECTRICAL COLOR CONTROL FILM AND VEHICLE OUTER PANEL

CROSS-REFERENCE TO RELATED APPLICATION

This application claims priority to Japanese Patent Application No. 2021-063760 filed on Apr. 2, 2021, incorporated herein by reference in its entirety.

BACKGROUND

1. Technical Field

The present disclosure relates to electrical color control films and vehicle outer panels.

2. Description of Related Art

An electrochromic device formed on a base is conventionally known in the art (see, for example, Japanese Unexamined Patent Application Publication (Translation of PCT Application) No. 2017-520808 (JP 2017-520808 A)).

The electrochromic device of JP 2017-520808 A includes a lower transparent conductive layer located on a base, electrochromic (EC) layers located on the lower transparent conductive layer, and an upper transparent conductive layer located on the EC layers. An electrochromic device can change its coloring state by applying a current to an EC layer. For example, the base is glass.

SUMMARY

It can be difficult to appropriately form an electrochromic device depending on the material and shape of a base.

The present disclosure provides an electrical color control film that can be appropriately formed regardless of the material and shape of a base. The present disclosure provides a vehicle outer panel that can change its color by using the electrical color control film.

A first aspect of the present disclosure relates to an electrical color control film. The electrical color control film includes: an underlying layer located on a base; a first transparent conductive layer located on the underlying layer; a first electrical color control layer located on the first transparent conductive layer; and a second transparent conductive layer located on the first electrical color control layer. The first electrical color control layer is configured in such a manner that color of the first electrical color control layer is controlled by electricity.

With this configuration, the underlying layer is located between the base and the first conductive layer. The electrical color control film can therefore be appropriately formed regardless of the material and shape of the base.

In the electrical color control film, the underlying layer may be white or silver.

In the electrical color control film, the base may be a metal plate, and the underlying layer may have insulating properties.

The electrical color control film may further include: a second electrical color control layer located on the second transparent conductive layer; and a third transparent conductive layer located on the second electrical color control layer. The first and second electrical color control layers may be electrochromic layers or liquid crystal layers, coloring state of the electrochromic layers or liquid crystal layers being changed by application of a current, and may be configured to change to different colors from each other.

In this case, the electrical color control film may further include: a third electrical color control layer located on the third transparent conductive layer; and a fourth transparent conductive layer located on the third electrical color control layer. The third electrical color control layer may be an electrochromic layer or liquid crystal layer, coloring state of the electrochromic layer or liquid crystal layer being changed by application of a current, and the first to third electrical color control layers may be configured to change to cyan, magenta, and yellow.

The electrical color control film may further include a protective layer that is an uppermost layer, and the protective layer may be configured to protect the transparent conductive layers and the electrical color control layer that are located between the underlying layer and the protective layer.

In the electrical color control film, the base may have a three-dimensional shape with a protruding or recessed portion or a curved portion.

In the electrical color control film, at least one layer out of the first to fourth transparent conductive layers and the first to third electrical color control layer that are located on or above the underlying layer may be made by spraying.

A second aspect of the present disclosure relates to a vehicle outer panel including one of the electrical color control films described above.

The electrical color control film of the first aspect can be appropriately formed regardless of the material and shape of the base. The vehicle outer panel of the second aspect can change its color by using the electrical color control film.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described.

First Embodiment

Figure 1:
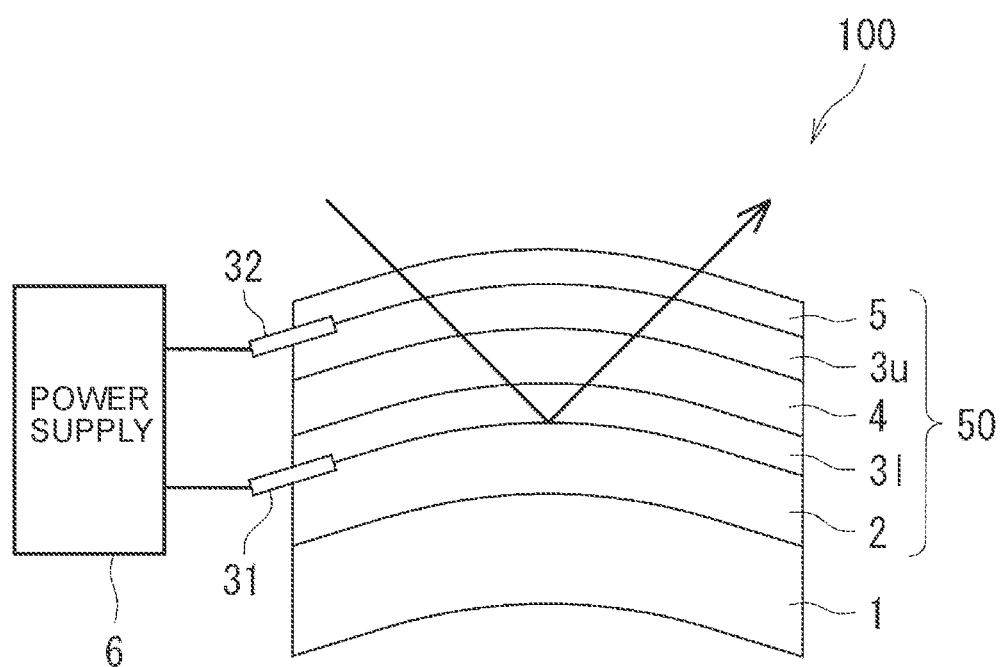
FIG. 1 is a schematic view illustrating a vehicle outer panel of a first embodiment.

First, the configuration of a vehicle outer panel 100 according to a first embodiment of the present disclosure will be described with reference to FIG. 1.

The vehicle outer panel 100 is a panel that is mounted on the outside of a vehicle, and forms a design surface of the vehicle. As shown in FIG. 1, the vehicle outer panel 100 includes a metal plate 1 and an electrical color control film 50 located on the metal plate 1. The vehicle outer panel 100 can therefore change its color using electricity.

The metal plate 1 is a body of the vehicle outer panel 100 and serves as a base on which the electrical color control film 50 is formed. For example, the metal plate 1 has a three-dimensional shape with a protruding or recessed portion or a curved portion. The metal plate 1 is an example of the "base" in the present disclosure.

The electrical color control film 50 includes an electrochromic layer (EC layer) 4, transparent conductive layers 31, 3u, an underlying layer 2, and a protective layer 5. The electrical color control film 50 can change the coloring state of the EC layer 4 by application of a current. The electrical color control film 50 is located on the outside (side that is seen visually) of the metal plate 1. Specifically, the underlying layer 2 is located on the metal plate 1, the transparent conductive layer 31 is located on the underlying layer 2, the EC layer 4 is located on the transparent conductive layer 31, the transparent conductive layer 3u is located on the EC layer 4, and the protective layer 5 is located on the transparent conductive layer 3u.

The underlying layer 2 has insulating properties and is located between the metal plate 1 and the transparent conductive layer 31. That is, the underlying layer 2 is configured to insulate the metal plate 1 from the transparent conductive layer 31. For example, the underlying layer 2 is white and diffusely reflects substantially all of the light in the visible region.

The EC layer 4 is colored or bleached by an electrochemical reaction, and has memory properties of maintaining its colored or bleached state. That is, when the EC layer 4 is colored by application of a current, the colored state of the EC layer 4 is maintained even after the current application is stopped. When the EC layer 4 is bleached by application of a current, the bleached state of the EC layer 4 is maintained even after the current application is stopped. The EC layer 4 is an example of the "first electrical color control layer" in the present disclosure.

The transparent conductive layers 31, 3u are provided in order to apply a current to the EC layer 4. The transparent conductive layers 31, 3u are transparent and electrically conductive, and are located with the EC layer 4 interposed therebetween. The transparent conductive layer 31 is provided with a terminal portion 31, and the transparent conductive layer 3u is provided with a terminal portion 32. The terminal portions 31, 32 can be connected to a power supply 6. The power supply 6 can apply a voltage between the transparent conductive layers 31, 3u to apply a current to the EC layer 4. The power supply 6 can change the polarity of the voltage to be applied between the transparent conductive layers 31, 3u. The transparent conductive layers 31, 3u are an example of the "first transparent conductive layer" and the "second transparent conductive layer" in the present disclosure, respectively.

The protective layer 5 is the uppermost (outermost) layer and is weather resistant. The protective layer 5 is configured to protect the transparent conductive layers 31, 3u and the EC layer 4 that are located between the underlying layer 2 and the protective layer 5. The protective layer 5 is transparent and has insulating properties.

The underlying layer 2, the transparent conductive layers 31, 3u, the EC layer 4, and the protective layer 5 may be formed by, for example, spraying. Specifically, each of these layers can be formed by spraying using a coater that sprays (atomizes) the material of each layer onto a surface on which the layer is to be formed. The coater that sprays the material may be of any type. For example, the coater may be an air spray coater or a rotary atomizing coater. Shaping air may be used when spraying the material, or electrostatic spraying using static electricity may be used.

Color Change

Next, color change of the vehicle outer panel 100 according to the first embodiment will be described with reference to FIG. 1. When the EC layer 4 is in the bleached state, the color of the vehicle outer panel 100 is the color of the underlying layer 2 (white).

The EC layer 4 is colored when a current is applied from the power supply 6 to the EC layer 4. That is, light in a predetermined wavelength region of the visible region is absorbed by the EC layer 4, so that the complementary color of the absorbed light can be seen. The color of the vehicle outer panel 100 therefore changes to the color of the EC layer 4. Since the EC layer 4 has memory properties, the colored state of the EC layer 4 is maintained even after the current application by the power supply 6 is stopped.

When returning the color of the vehicle outer panel 100 to its original color, a current is applied from the power supply 6 to the EC layer 4 in the opposite direction to when a current is applied to color the EC layer 4. The EC layer 4 is thus bleached.

Effects

As described above, in the first embodiment, the vehicle outer panel 100 includes the electrical color control film 50. The color of the vehicle outer panel 100 can therefore be changed using the electrical color control film 50. The color of the vehicle outer panel 100 can be more easily changed as compared to, for example, repainting a vehicle outer panel.

In the first embodiment, the electrical color control film 50 includes the underlying layer 2. The electrical color control film 50 can therefore be appropriately formed regardless of the material and shape of the base. That is, since the electrical color control film 50 includes the underlying layer 2, the transparent conductive layer 31 etc. are formed uniformly. Color control of the electrical color control film 50 is therefore stabilized.

In the first embodiment, the electrical color control film 50 is formed on the metal plate 1, and the underlying layer 2 has insulating properties. This configuration reduces the influence of the metal plate 1 on color control. That is, a current can be appropriately applied to the EC layer 4 when changing the color of the vehicle outer panel 100.

In the first embodiment, each layer of the electrical color control film 50 is formed by spraying. This facilitates formation of the electrical color control film 50 on the metal plate 1 having a three-dimensional shape and also facilitates formation of the electrical color control film 50 with a large area. Unlike the case where an electrical color control film is formed as a separate film and then attached, no wrinkling occurs and formation of air bubbles is reduced. Impurities that are as small as invisible such as fine dust are absorbed and mixed into the electrical color control film 50 before the electrical color control film 50 dries. Accordingly, such impurities are less likely to affect the formed electrical color control film 50.

In the first embodiment, since the vehicle outer panel 100 includes the protective layer 5, the vehicle outer panel 100 has improved weather resistance.

Second Embodiment

Figure 2:
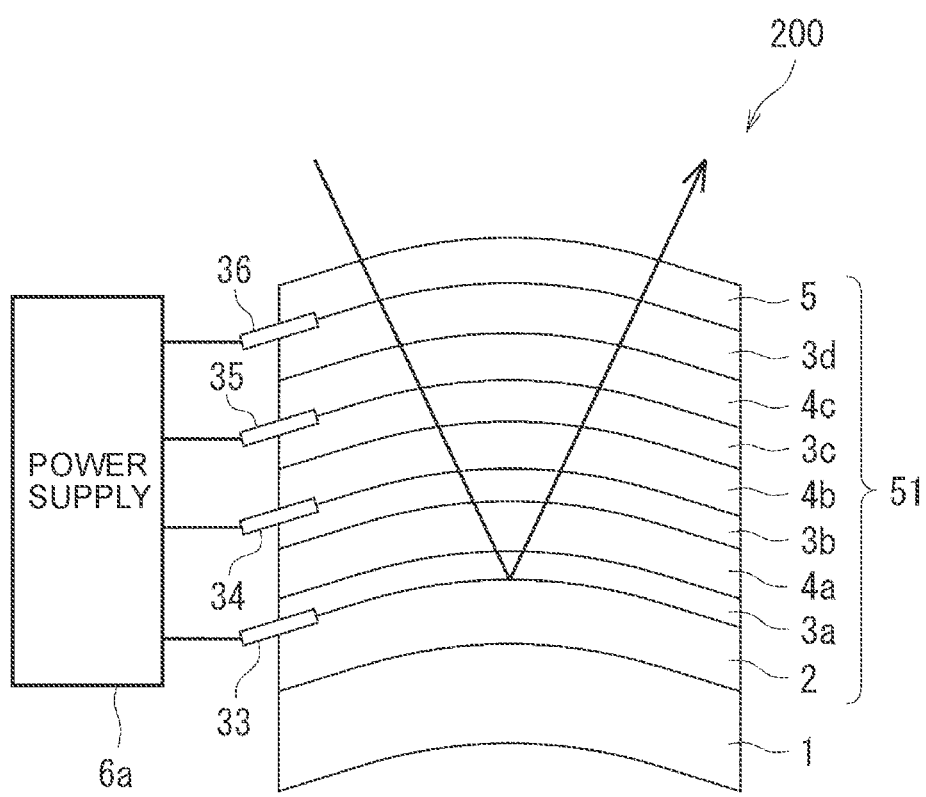
FIG. 2 is a schematic view illustrating a vehicle outer panel of a second embodiment.

Next, the configuration of a vehicle outer panel 200 according to a second embodiment of the present disclosure will be described with reference to FIG. 2. In the second embodiment, three EC layers 4a to 4c are stacked together.

The vehicle outer panel 200 is a panel that is mounted on the outside of a vehicle, and forms a design surface of the vehicle. As shown in FIG. 2, the vehicle outer panel 200 includes the metal plate 1 and an electrical color control film 51 located on the metal plate 1. The vehicle outer panel 200 can therefore change its color using electricity.

The electrical color control film 51 includes the EC layers 4a to 4c, transparent conductive layers 3a to 3d, the underlying layer 2, and the protective layer 5. The electrical color control film 51 can change the coloring states of the EC layers 4a to 4c by application of a current. The electrical color control film 51 is located on the outside (side that is seen visually) of the metal plate 1.

Specifically, the underlying layer 2 is located on the metal plate 1, the transparent conductive layer 3a is located on the underlying layer 2, the EC layer 4a is located on the transparent conductive layer 3a, the transparent conductive layer 3b is located on the EC layer 4a, the EC layer 4b is located on the transparent conductive layer 3b, the transparent conductive layer 3c is located on the EC layer 4b, the EC layer 4c is located on the transparent conductive layer 3c, the transparent conductive layer 3d is located on the EC layer 4c, and the protective layer 5 is located on the transparent conductive layer 3d.

The EC layer 4a is configured to change to yellow when colored, the EC layer 4b is configured to change to magenta when colored, and the EC layer 4c is configured to change to cyan when colored. That is, the EC layers 4a to 4c can be colored to three subtractive primary colors. The configuration of the EC layers 4a to 4c is otherwise similar to that of the EC layer 4 described above. The EC layers 4a to 4c are an example of the "first electrical color control layer," the "second electrical color control layer," and the "third electrical color control layer" in the present disclosure, respectively.

The transparent conductive layers 3a to 3d are provided in order to individually apply a current to the EC layers 4a to 4c. The transparent conductive layer 3a is provided with a terminal portion 33, the transparent conductive layer 3b is provided with a terminal portion 34, the transparent conductive layer 3c is provided with a terminal portion 35, and the transparent conductive layer 3d is provided with a terminal portion 36. The terminal portions 33 to 36 can be connected to a power supply 6a. The transparent conductive layers 3a to 3d are an example of the "first transparent conductive layer," the "second transparent conductive layer," the "third transparent conductive layer," and the "fourth transparent conductive layer" in the present disclosure, respectively.

The power supply 6a can apply a voltage between the transparent conductive layers 3a, 3b to apply a current to the EC layer 4a. The power supply 6a can change the polarity of the voltage to be applied between the transparent conductive layers 3a, 3b. The power supply 6a can apply a voltage between the transparent conductive layers 3b, 3c to apply a current to the EC layer 4b. The power supply 6a can change the polarity of the voltage to be applied between the transparent conductive layers 3b, 3c. The power supply 6a can apply a voltage between the transparent conductive layers 3c, 3d to apply a current to the EC layer 4c. The power supply 6a can change the polarity of the voltage to be applied between the transparent conductive layers 3c, 3d.

Color Change

Next, color change of the vehicle outer panel 200 according to the second embodiment will be described with reference to FIG. 2. When the EC layers 4a to 4c are in the bleached state, the color of the vehicle outer panel 200 is the color of the underlying layer 2 (white).

When only the EC layer 4a is colored, the color of the vehicle outer panel 200 changes to yellow. When only the EC layer 4b is colored, the color of the vehicle outer panel 200 changes to magenta. When only the EC layer 4c is colored, the color of the vehicle outer panel 200 changes to cyan. When the EC layers 4a, 4b are colored, the color of the vehicle outer panel 200 changes to red. When the EC layers 4a, 4c are colored, the color of the vehicle outer panel 200 changes to green. When the EC layers 4b, 4c are colored, the color of the vehicle outer panel 200 changes to blue. When the EC layers 4a to 4c are colored, the color of the vehicle outer panel 200 changes to black.

Effects

As described above, in the second embodiment, the EC layers 4a to 4c that can be colored to three subtractive principal colors are provided. Accordingly, the color of the vehicle outer panel 200 can be changed to various colors. The color of the vehicle outer panel 200 can be changed in full color by controlling the degrees of coloration of the EC layers 4a to 4c.

Effects of the second embodiment are otherwise similar to those of the first embodiment.

Third Embodiment

Figure 3:
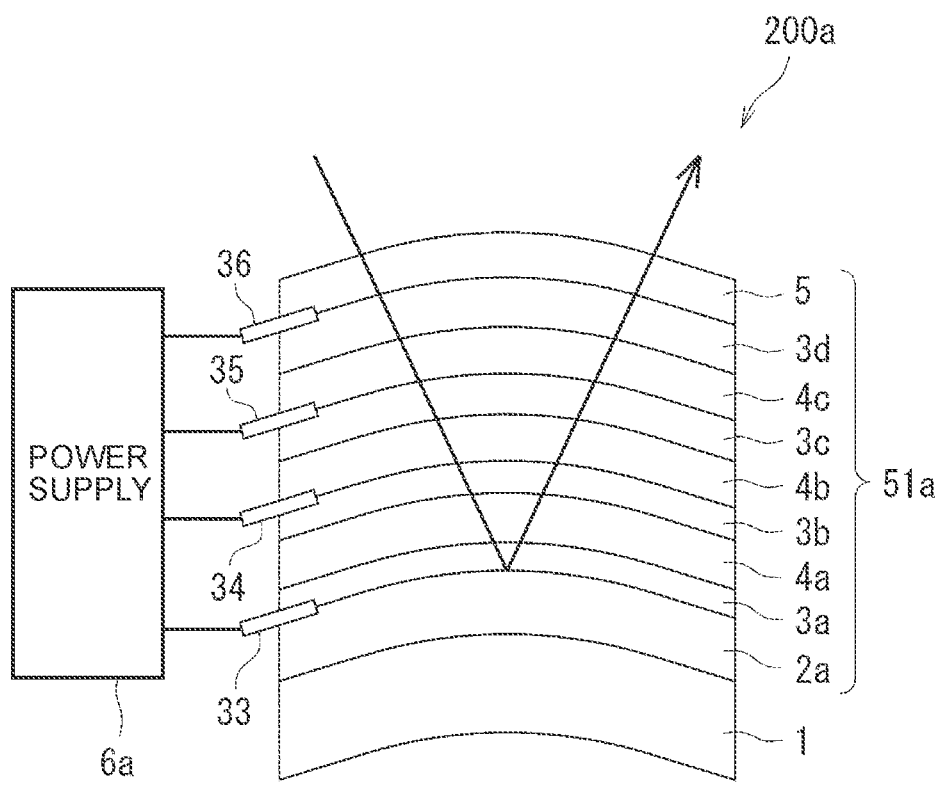
FIG. 3 is a schematic view illustrating a vehicle outer panel of a third embodiment.

Next, a vehicle outer panel 200a according to a third embodiment of the present disclosure will be described with reference to FIG. 3. In the third embodiment, the vehicle outer panel 200a includes a silver underlying layer 2a.

The vehicle outer panel 200a is a panel that is mounted on the outside of a vehicle, and forms a design surface of the vehicle. As shown in FIG. 3, the vehicle outer panel 200a includes the metal plate 1 and an electrical color control film Ma located on the metal plate 1. The vehicle outer panel 200a can change its color using electricity.

The electrical color control film 51a includes the EC layers 4a to 4c, the transparent conductive layers 3a to 3d, the underlying layer 2a, and the protective layer 5. The underlying layer 2a has insulating properties and is located between the metal plate 1 and the transparent conductive layer 3a. That is, the underlying layer 2a is configured to insulate the metal plate 1 from the transparent conductive layer 3a. The underlying layer 2a is, for example, silver and is glossy. That is, the underlying layer 2a reflects light with high directivity. The configuration of the electrical color control film 51a is otherwise similar to that of the electrical color control film 51 described above.

Accordingly, when the EC layers 4a to 4c are in the bleached state, the color of the vehicle outer panel 200a is the color of the underlying layer 2a (silver). Depth can be given to the color of the vehicle outer panel 200a by selectively coloring the EC layers 4a to 4c.

Effects of the third embodiment are otherwise similar to those of the second embodiment.

Fourth Embodiment

Next, a vehicle outer panel 300 according to a fourth embodiment of the present disclosure will be described with reference to FIGS. 4 and 5. In the fourth embodiment, the vehicle outer panel 300 includes an electrophoretic layer 7.

The vehicle outer panel 300 is a panel that is mounted on the outside of a vehicle, and forms a design surface of the vehicle. As shown in FIGS. 4 and 5, the vehicle outer panel 300 includes the metal plate 1 and an electrical color control film 52 located on the metal plate 1. The vehicle outer panel 300 can therefore change its color using electricity.

The electrical color control film 52 includes the electrophoretic layer 7, the transparent conductive layers 31, 3u, an underlying layer 2b, and the protective layer 5. The electrical color control film 52 can change the color of the electrophoretic layer 7 by application of a voltage. The electrical color control film 52 is located on the outside (side that is seen visually) of the metal plate 1. Specifically, the underlying layer 2b is located on the metal plate 1, the transparent conductive layer 31 is located on the underlying layer 2b, the electrophoretic layer 7 is located on the transparent conductive layer 31, the transparent conductive layer 3u is located on the electrophoretic layer 7, and the protective layer 5 is located on the transparent conductive layer 3u. The underlying layer 2b has insulating properties and is located between the metal plate 1 and the transparent conductive layer 31. That is, the underlying layer 2b is configured to insulate the metal plate 1 from the transparent conductive layer 31.

The electrophoretic layer 7 is interposed between the transparent conductive layers 31, 3u. The terminal portion 31 for the transparent conductive layer 31 and the terminal portion 32 for the transparent conductive layer 3u can be connected to the power supply 6. The power supply 6 can apply a voltage between the transparent conductive layers 31, 3u. The power supply 6 can change the polarity of the voltage to be applied between the transparent conductive layers 31, 3u. The transparent conductive layers 31, 3u are an example of the "first transparent conductive layer" and the "second transparent conductive layer" in the present disclosure, respectively.

The electrophoretic layer 7 includes, for example, positively charged black particles 71 and negatively charged white particles 72. The electrophoretic layer 7 is configured so that the black particles 71 and the white particles 72 can move in an electric field. The electric field in which the black particles 71 and the white particles 72 move is formed by applying a voltage between the transparent conductive layers 31, 3u by the power supply 6. Since the power supply 6 can change the polarity of the voltage, the black particles 71 can be moved toward the front side, and the white particles 72 can also be moved toward the front side.

Figure 4:
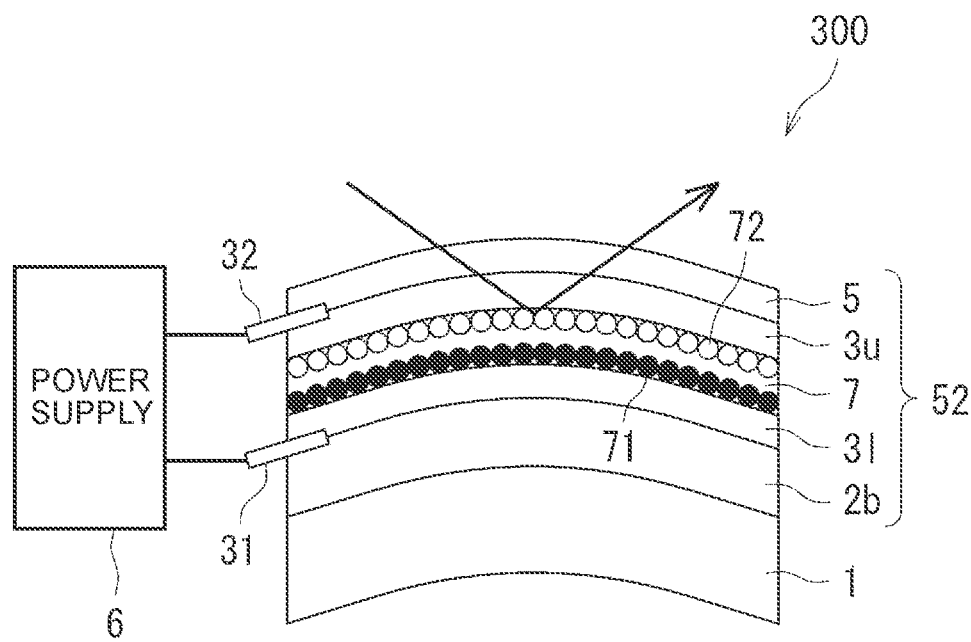
FIG. 4 is a schematic view illustrating a vehicle outer panel of a fourth embodiment.
Figure 5:
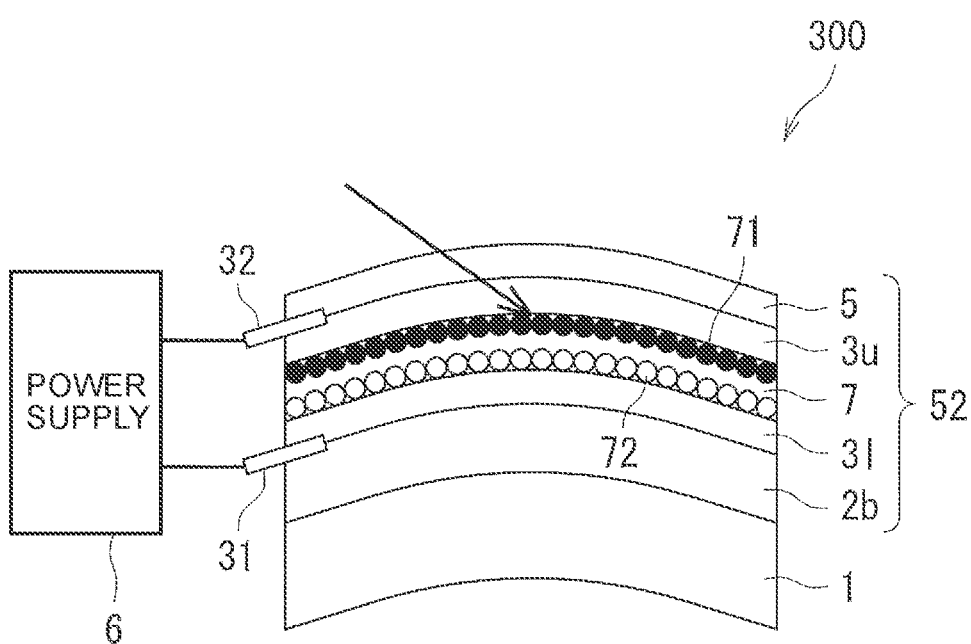
FIG. 5 is a schematic view of the vehicle outer panel of FIG. 4 with its color switched.

As shown in FIG. 4, the color of the vehicle outer panel 300 is white when the white particles 72 are located on the front side. As shown in FIG. 5, the color of the vehicle outer panel 300 is black when the black particles 71 are located on the front side. The electrophoretic layer 7 needs electricity only when changing the color, and has memory properties. The electrophoretic layer 7 is an example of the "first electrical color control layer" in the present disclosure.

Effects of the fourth embodiment are otherwise similar to those of the first embodiment.

Fifth Embodiment

Figure 6:
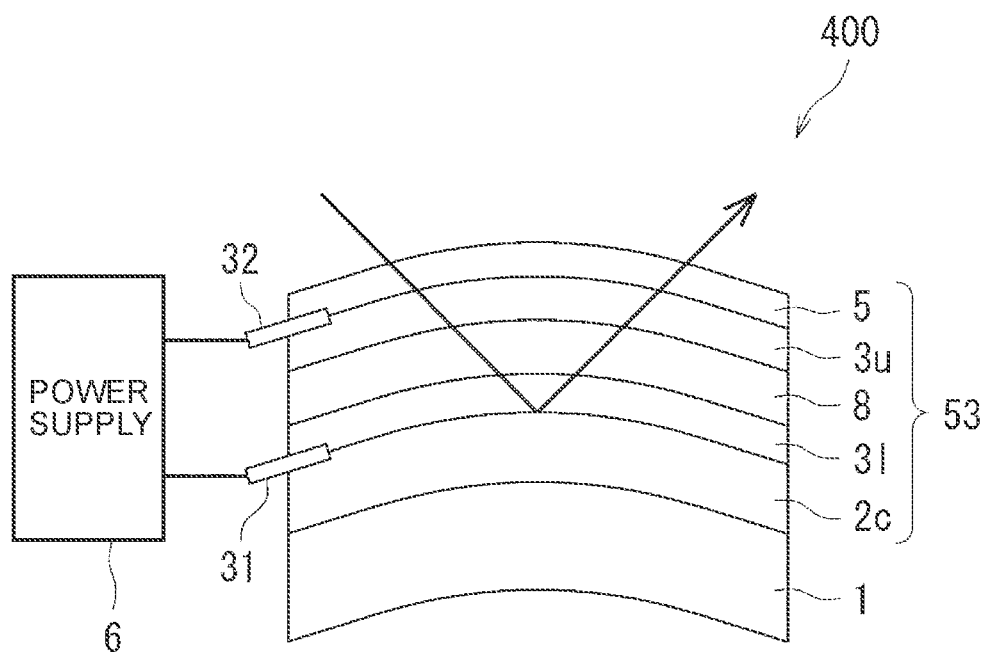
FIG. 6 is a schematic view illustrating a vehicle outer panel of a fifth embodiment.
Figure 7:
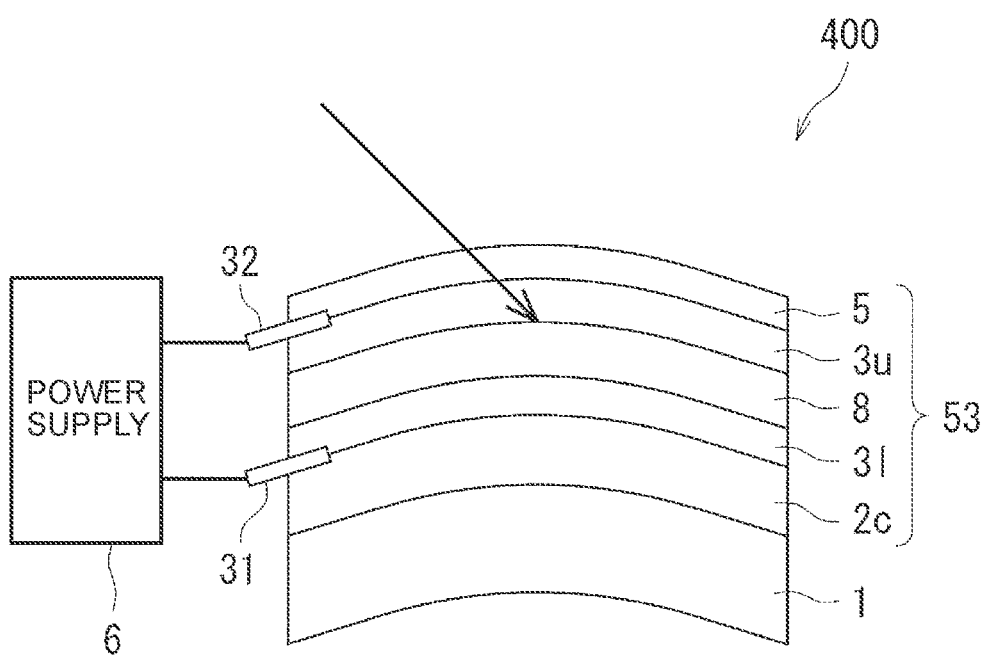
FIG. 7 is a schematic view of the vehicle outer panel of FIG. 6 with its color switched.

Next, a vehicle outer panel 400 according to a fifth embodiment of the present disclosure will be described with reference to FIGS. 6 and 7. In the fifth embodiment, the vehicle outer panel 400 includes a liquid crystal layer 8.

The vehicle outer panel 400 is a panel that is mounted on the outside of a vehicle, and forms a design surface of the vehicle. As shown in FIGS. 6 and 7, the vehicle outer panel 400 includes the metal plate 1 and an electrical color control film 53 located on the metal plate 1. The vehicle outer panel 400 can therefore change its color using electricity.

The electrical color control film 53 includes the liquid crystal layer 8, the transparent conductive layers 31, 3u, an underlying layer 2c, and the protective layer 5. The electrical color control film 53 can change the light transmittance of the liquid crystal layer 8 by application of a voltage. The electrical color control film 53 is located on the outside (side that is seen visually) of the metal plate 1. Specifically, the underlying layer 2c is located on the metal plate 1, the transparent conductive layer 31 is located on the underlying layer 2c, the liquid crystal layer 8 is located on the transparent conductive layer 31, the transparent conductive layer 3u is located on the liquid crystal layer 8, and the protective layer 5 is located on the transparent conductive layer 3u. For example, the underlying layer 2c is configured similarly to the underlying layer 2 described above.

The liquid crystal layer 8 is interposed between the transparent conductive layers 31, 3u. The terminal portion 31 for the transparent conductive layer 31 and the terminal portion 32 for the transparent conductive layer 3u can be connected to the power supply 6. The power supply 6 can apply a voltage between the transparent conductive layers 31, 3u. The transparent conductive layers 31, 3u are an example of the "first transparent conductive layer" and the "second transparent conductive layer" in the present disclosure, respectively.

The liquid crystal layer 8 is configured to allow light to pass therethrough when no voltage is applied, and is configured to block light when a voltage is applied. Accordingly, when no voltage is applied between the transparent conductive layers 31, 3u by the power supply 6 and light passes through the liquid crystal layer 8 as shown in FIG. 6, the color of the vehicle outer panel 400 is the color of the underlying layer 2c (white). On the other hand, when a voltage is applied between the transparent conductive layers 31, 3u by the power supply 6 and light is blocked by the liquid crystal layer 8 as shown in FIG. 7, the color of the vehicle outer panel 400 is black. The liquid crystal layer 8 is an example of the "first electrical color control layer" in the present disclosure.

Effects of the fifth embodiment are otherwise similar to those of the first embodiment.

OTHER EMBODIMENTS

The embodiments disclosed herein are illustrative in all respects, and do not constitute a basis for a limited interpretation. Accordingly, the technical scope of the present disclosure should not be construed only by the embodiments described above, but should be defined based on the claims. The technical scope of the present disclosure includes all modifications within the meaning and scope equivalent to those of the claims.

For example, the first embodiment shows an example in which the present disclosure is applied to the vehicle outer panel 100. However, the present disclosure is not limited to this, and the present disclosure may be applied to things other than vehicle outer panels. The same applies to the second to fifth embodiments.

The first embodiment shows an example in which the electrical color control film 50 is located on the metal plate 1. However, the present disclosure is not limited to this, and the electrical color control film may be located on a resin plate. The same applies to the second to fifth embodiments.

The first embodiment shows an example in which the metal plate 1 has a protruding or recessed portion or a curved portion. However, the present disclosure is not limited to this, and the metal plate may have neither a protruding or recessed portion nor a curved portion. That is, the metal plate may be a flat plate. The same applies to the second to fifth embodiments.

The first embodiment shows an example in which a single EC layer 4 is provided, and each of the second and third embodiments show an example in which three EC layers 4a to 4c are provided. However, the present disclosure is not limited to this, and the number of EC layers may be two or may be four or more. In this case, for example, the EC layers are configured to change to different colors from each other.

The first embodiment shows an example in which the EC layer 4 whose coloring state is changed by application of a current is provided. However, the present disclosure is not limited to this, and a liquid crystal layer whose coloring state is changed by application of a current may be provided. The same applies to the second and third embodiments. That is, a liquid crystal layer that changes to yellow when colored, a liquid crystal layer that changes to magenta when colored, and a liquid crystal layer that changes to cyan when colored may be stacked together.

The first embodiment shows an example in which the underlying layer 2 is white. However, the present disclosure is not limited to this, and the color of the underlying layer may be other color such as silver. The same applies to the fifth embodiment.

In the first embodiment, the EC layer 4 may change to any color when colored as long as the color of the vehicle outer panel 100 changes before and after coloring.

The first embodiment shows an example in which the underlying layer 2, the transparent conductive layers 31, 3u, the EC layer 4, and the protective layer 5 are formed by spraying. However, the present disclosure is not limited to this, and the underlying layer, the transparent conductive layers, the EC layer, and the protective layer may be formed by a method other than spraying. Alternatively, a part of the underlying layer, the transparent conductive layers, the EC layer, and the protective layer may be formed by spraying, and the remainder of the underlying layer, the transparent conductive layers, the EC layer, and the protective layer may be formed by a method other than spraying. The same applies to the second to fifth embodiments.

Each of the second and third embodiments shows an example in which the yellow EC layer 4a, the magenta EC layer 4b, and the cyan EC layer 4c are stacked in this order from bottom to top. However, the present disclosure is not limited to this, and these three EC layers may be stacked in any order.

The present disclosure can be used for electrical color control films and vehicle outer panels including the same.

What is claimed is:

1. A vehicle outer panel comprising an electrical color control film, the electrical color control film, comprising:
   an underlying layer located on a base, wherein the base is a body of the vehicle outer panel,
   a first transparent conductive layer located on the underlying layer;
   a first electrical color control layer located on the first transparent conductive layer; and
   a second transparent conductive layer located on the first electrical color control layer,
   wherein the first electrical color control layer is configured in such a manner that color of the first electrical color control layer is controlled by electricity, and
   wherein the electrical color control film is configured to change a color of the vehicle outer panel.

2. The vehicle control panel according to claim 1, wherein the base is a metal plate, the underlying layer has insulating properties, and a color of the underlying layer is silver or white.

3. The vehicle control panel according to claim 1, wherein the electrical color control film further comprises:
   a second electrical color control layer located on the second transparent conductive layer; and
   a third transparent conductive layer located on the second electrical color control layer,
   wherein the first and second electrical color control layers are electrochromic layers or liquid crystal layers, coloring state of the electrochromic layers or liquid crystal layers being changed by application of a current, and are configured to change to different colors from each other.

4. The vehicle control panel according to claim 3, wherein the electrical color control film further comprises:
   a third electrical color control layer located on the third transparent conductive layer; and
   a fourth transparent conductive layer located on the third electrical color control layer, wherein:
   the third electrical color control layer is an electrochromic layer or liquid crystal layer, coloring state of the electrochromic layer or liquid crystal layer being changed by application of a current; and
   the first to third electrical color control layers are configured to change to cyan, magenta, and yellow.

5. The vehicle outer panel according to claim 1, further comprising a protective layer that is an uppermost layer, wherein the protective layer is configured to protect the first and second transparent conductive layers and the first electrical color control layer that are located between the underlying layer and the protective layer.

6. The vehicle outer panel according to claim 1, wherein the base has a three-dimensional shape with a protruding or recessed portion or a curved portion.

7. The vehicle outer panel according to claim 1, wherein at least one layer out of the first and second transparent conductive layers and the first electrical color control layer that are located on or above the underlying layer is made by spraying.

* * * * *